(12) United States Patent
Liu et al.

(10) Patent No.: US 9,225,454 B1
(45) Date of Patent: Dec. 29, 2015

(54) AGGREGATION AND DE-AGREGGATION OF BANDWIDTH WITHIN DATA CENTERS USING PASSIVE OPTICAL ELEMENTS

(75) Inventors: Hong Liu, Palo Alto, CA (US); Amin Vahdat, Los Altos, CA (US); Ryohei Urata, Sunnyvale, CA (US); Xiaoxue Zhao, Fremont, CA (US); Chris Johnson, San Francisco, CA (US)

(73) Assignee: Google Inc., Mountain View, CA (US)

( * ) Notice: Subject to any disclaimer, the term of this patent is extended or adjusted under 35 U.S.C. 154(b) by 367 days.

(21) Appl. No.: 13/282,229

(22) Filed: Oct. 26, 2011

(51) Int. Cl.
*H04J 14/02* (2006.01)

(52) U.S. Cl.
CPC ........................ *H04J 14/02* (2013.01)

(58) Field of Classification Search
CPC ................. H04Q 11/0005; H04Q 2011/0016; H04Q 2011/0052
USPC ..................................... 398/45, 58
See application file for complete search history.

(56) References Cited

U.S. PATENT DOCUMENTS

| 5,479,539 | A | 12/1995 | Goldsmith et al. | |
|---|---|---|---|---|
| 7,941,052 | B2 * | 5/2011 | Epitaux et al. | 398/138 |
| 2001/0048799 | A1 | 12/2001 | King et al. | |
| 2002/0071159 | A1 | 6/2002 | Lange et al. | |
| 2011/0211799 | A1 * | 9/2011 | Conner et al. | 385/135 |
| 2011/0217039 | A1 * | 9/2011 | Smith | 398/49 |
| 2012/0099863 | A1 * | 4/2012 | Xu et al. | 398/49 |

OTHER PUBLICATIONS

H. Rastegarfar et al., "A High-Performance Network Architecture for Scalable Optical Datacenters", Photonics Conference 2011, Oct. 9-13, 2011.*
C. Lam et al., "Fiber Optical Communication Technologies: What's Needed for Datacenter Network Operations", IEEE Communications Magazine, Jul. 2010.*
Liu, H. et al., "Scaling Optical Interconnects in Datacenter Networks Opportunities and Challenges for WDM", 2010 18th IEEE Symposium on High Performance Interconnects, Aug. 2010, pp. 113-116.
Liu, H. et al., "Single Mode Fiber and WDM Transceiver-Based Interconnect for Cross-Generational Warehouse Scale Computing," U.S. Appl. No. 13/109,340, filed May 17, 2011, 41 pages.

* cited by examiner

*Primary Examiner* — Shi K Li
(74) *Attorney, Agent, or Firm* — Edward A. Gordon; Foley & Lardner LLP

(57) ABSTRACT

The specification describes an apparatus including a plurality of communication ports, each communication port coupled to a corresponding networking element, and a plurality of optical transceivers, each optical transceiver coupled to a corresponding communication port and including an optical receiver and an optical transmitter, wherein the optical transmitter can transmit an optical data signal having a carrier wavelength different than any other of the plurality of optical transmitters. A passive optical multiplexer/demultiplexer module is coupled to the transceivers and includes an optical multiplexer including a wavelength division multiplexing (WDM) output and a plurality of inputs, each input coupled to one of the plurality of transmitters, and an optical demultiplexer including a WDM input and a plurality of outputs, each output coupled to one of the plurality of receivers. Placing the passive optical multiplexer and demultiplexer external to the optical transceivers creates an aggregation/de-aggregation point with extremely low fault probability.

13 Claims, 6 Drawing Sheets

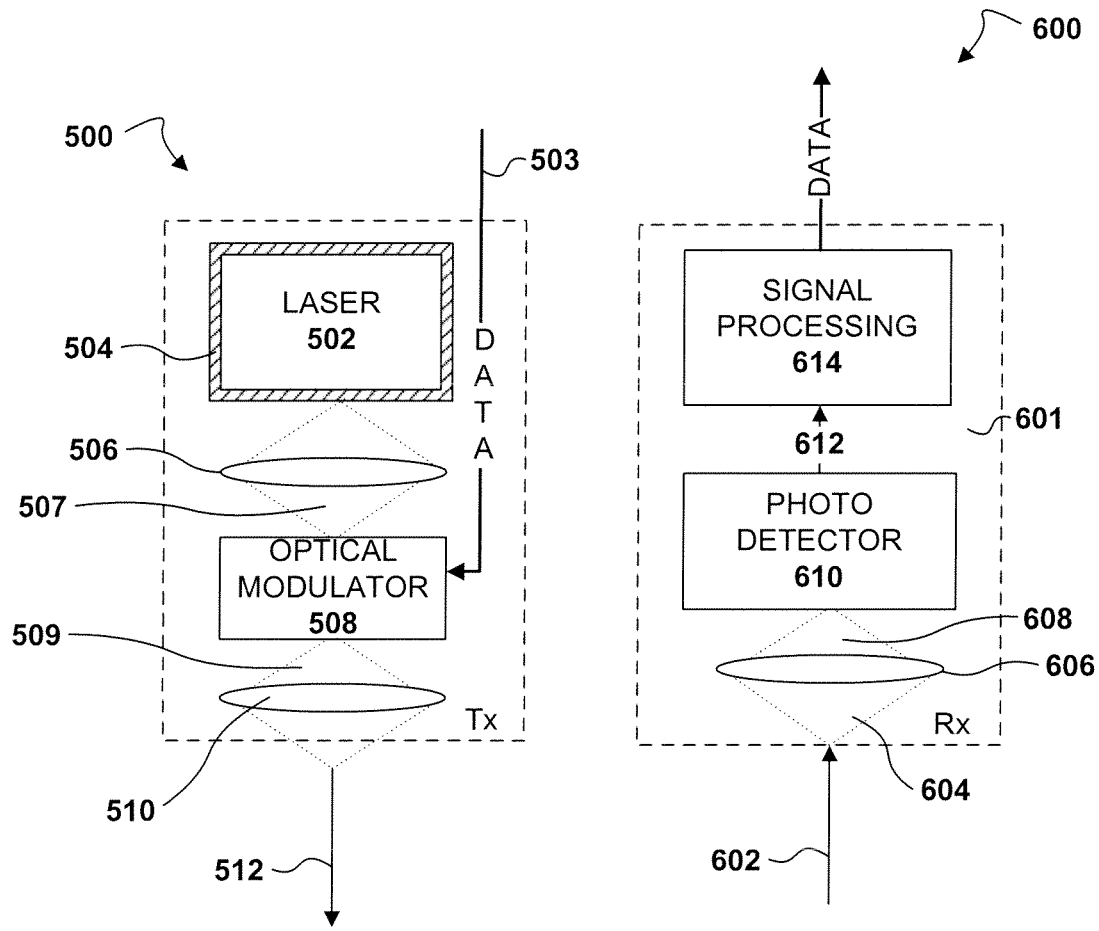
*Fig. 5*  *Fig. 6*

AGGREGATION AND DE-AGREGGATION OF BANDWIDTH WITHIN DATA CENTERS USING PASSIVE OPTICAL ELEMENTS

TECHNICAL FIELD

The disclosed implementations relate generally to optical communication and in particular, but not exclusively, to bandwidth aggregation and de-aggregation in wavelength division multiplexing (WDM) systems.

BACKGROUND

Cloud computing and its applications are changing the way people communicate and share information. Today, the underlying computer networks that support cloud computing and other services can consist of an enormous number of individual computers—thousands to tens of thousands of them—housed in large facilities and working in concert. These large facilities are referred to as warehouse-scale computers. As a result of their size, warehouse-scale computers require the interconnection of large numbers of computers and networking equipment (e.g., servers, switches and routers). The sheer number and scale of interconnection in warehouse-scale computers creates a need for low-cost interconnects with low power consumption and compact size.

BRIEF DESCRIPTION OF THE DRAWINGS

Non-limiting and non-exhaustive implementations of the present invention are described with reference to the following figures, wherein like reference numerals refer to like parts throughout the various views unless otherwise specified.

FIG. 5 is a block diagram of an implementation of an optical transmitter.

FIG. 6 is a block diagram of an implementation of an optical receiver.

DETAILED DESCRIPTION OF THE ILLUSTRATED IMPLEMENTATIONS

Implementations of an apparatus, system and method for bandwidth aggregation and de-aggregation are described. Numerous specific details are described to provide a thorough understanding of implementations of the invention, but one skilled in the relevant art will recognize that the invention can be practiced without one or more of the specific details, or with other methods, components, materials, etc. In some instances, well-known structures, materials, or operations are not shown or described in detail but are nonetheless encompassed within the scope of the invention.

Reference throughout this specification to "one implementation" or "an implementation" means that a particular feature, structure, or characteristic described in connection with the implementation is included in at least one described implementation. Thus, appearances of the phrases "in one implementation" or "in an implementation" in this specification do not necessarily all refer to the same implementation. Furthermore, the particular features, structures, or characteristics may be combined in any suitable manner in one or more implementations.

Figure 1:
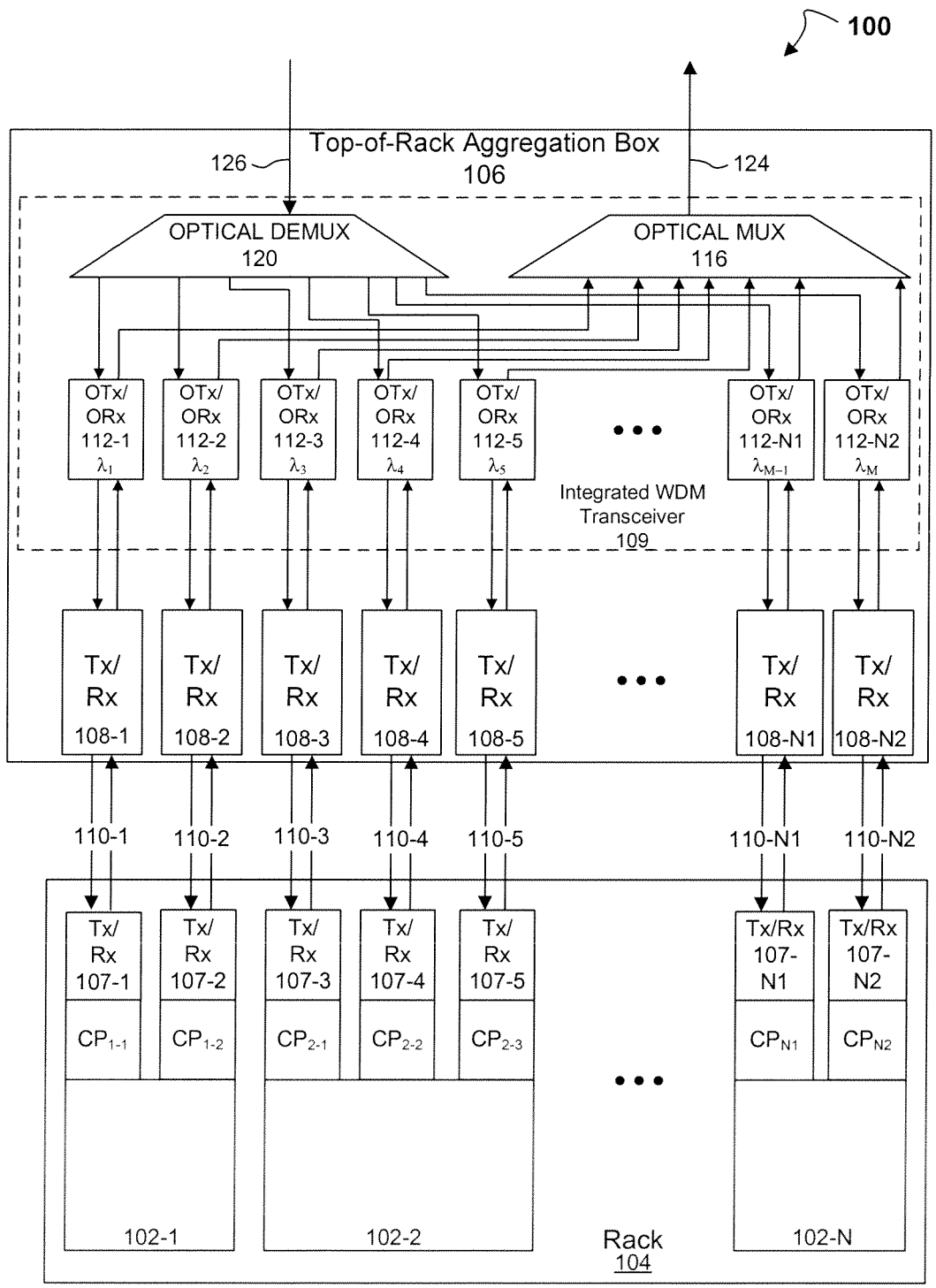
FIG. 1 is a block diagram of an aggregation and de-aggregation apparatus.

FIG. 1 illustrates an implementation of a bandwidth aggregator and de-aggregator apparatus 100. Apparatus 100 includes a plurality of networking elements 102-1 through 102-N housed in a rack 104, where N can be any number greater than one. Each networking element 102 can be a server, a router, a switch or some other kind of electrical networking and/or storage equipment. Each network element 102 is coupled to one or more corresponding communication ports (CPs): network element 102-1 is coupled communication ports CP1-1 and CP1-2, network element 102-2 is coupled communication ports CP2-1, CP2-2 and CP2-3, etc. Generally, a rack 104 having N networking elements 102 can have M communication ports, where M is equal to or greater than N. Each communication port can be coupled to a corresponding transceiver 107 to allow the network elements 102 to communicate with other network elements. Transceiver 107 may be either an optical transceiver (sends and receives optical signals) or an electrical driver and receiver. In the illustrated implementation each transceiver 107 is integrated with its corresponding CP, but in other implementations the transceiver, the CP, and the networking element can be separate elements.

A top-of-a rack (TOR) aggregation box 106 is positioned in rack 104, such as on top of rack 104. Aggregation box 106 can alternatively be located elsewhere, such as below or beside the rack or completely displaced away from the rack, determined in part by the nature of interconnection 110. Any time a "top-of-rack aggregation box" is described, this can be replaced with an aggregation box located elsewhere. Aggregation box 106 includes a plurality of transceivers 108, and an integrated wavelength division multiplexing (WDM) transceiver 109. Each transceiver 108 is communicatively coupled to a corresponding transceiver 107 by a communication link 110: transceiver 107-1 is coupled to transceiver 108-1 by link 110-1, transceiver 107-2 is coupled to transceiver 108-2 by link 110-2, etc. In one implementation, communication links 110 are electrical links, such as copper wire or cables, but in other implementations links 110 are optical links, for example a pair or multiple pairs of unidirectional multimode fiber (MMF) links, a single bidirectional MMF link, a pair or multiple pairs of unidirectional single mode fiber (SMF) links, or a single bidirectional SMF link or multiple bidirectional SMF links. In still other implementations, all links 110 need not be of the same type. In implementations where links 110 are electrical, transceivers 108 could be eliminated, leaving a direct electrical connection from transceivers 107 to optical transceivers 112 using active or passive electrical connections such as copper wires or cables.

In addition to being coupled to a corresponding transceiver 107, each transceiver 108 is also coupled to a corresponding optical transceiver 112 within integrated WDM transceiver 109. Each optical transceiver 112 includes an optical receiver (ORx) and an optical transmitter (OTx). In one implementation, in each optical transceiver 112 the optical transmitter includes a laser that generates an optical carrier signal at a wavelength λ, different than the carrier wavelength of the other optical transceivers 112; hence, optical transceiver 112-1 transmits at a carrier wavelength $\lambda_1$, optical transceiver 112-2 transmits at a carrier wavelength $\lambda_2$, where $\lambda_1$ is different from $\lambda_2$, and so forth. In each optical transmitter, data can then be modulated onto the optical carrier signal to create an optical data signal (see FIG. 5). The optical data signals from all optical transmitters are then fed into the optical multiplexer 116.

Optical multiplexer (mux) 116 and optical demultiplexer (demux) 120 are coupled to each of the plurality of transceivers 112. Each receiver is optically coupled to optical demultiplexer 120, while each transmitter has its output coupled to optical multiplexer 116. Optical multiplexer 116 receives optical signals from each transceiver 112, combines these signals into a WDM signal, and transmits the WDM signal through optical fiber 124. Similarly, optical demultiplexer 120 receives a WDM signal through an optical fiber 126, separates the individual signals from the WDM signal, and transmits the individual signals to the receivers in transceivers 112. A number of implementations are possible for the multiplexer, including, but not limited to: arrayed waveguide gratings, Echelle gratings and other gratings devices, optical splitter/combiners, thin film filters based wavelength combiners, optical coupler arrays, Littrow gratings, wavelength add-drop multiplexers and/or other kinds of optical multiplexing devices to combine optical signals with different carrier wavelengths into an optical WDM signal. Similarly, a number of implementations are possible for the demulitplexer, including, but not limited to: arrayed waveguide gratings, Echelle gratings and other grating devices, optical splitters with appropriate wavelength filters placed at each output port, thin film filters based wavelength splitters, splitter arrays with Fabry-Perot filters or other types of wavelength dependent filters, optical circulators with wavelength dependent filters, silicon ring oscillator, Littrow gratings, add-drop multiplexers, cascaded Mach-Zehnder interferometers, and other kinds of demultiplexing devices.

In operation of apparatus 100, signals originating from each network element 102 are transmitted through the corresponding CPs and transceivers 107 to transceivers 108. Transceivers 108 receive electrical signals and transmit them to optical transceivers 112. Optical transceivers 112 modulate data received from transceivers 108 onto optical carrier signals to create optical data signals. These optical data signals are then sent to optical multiplexer 116, where they are combined into an optical WDM signal that is then transmitted over single mode optical fiber 124. In the reverse direction, an optical WDM signal arrives at optical demultiplexer 120 via optical fiber 126. Demultiplexer 120 splits the WDM signal into its individual optical component signals, and the individual optical component signals are sent to transceivers 112. Transceivers 112 then perform opto-electric conversion and send the electrical signals to transceivers 108, which then forward signals to transceivers 107 and their corresponding CPs and network elements 102.

Figure 2:
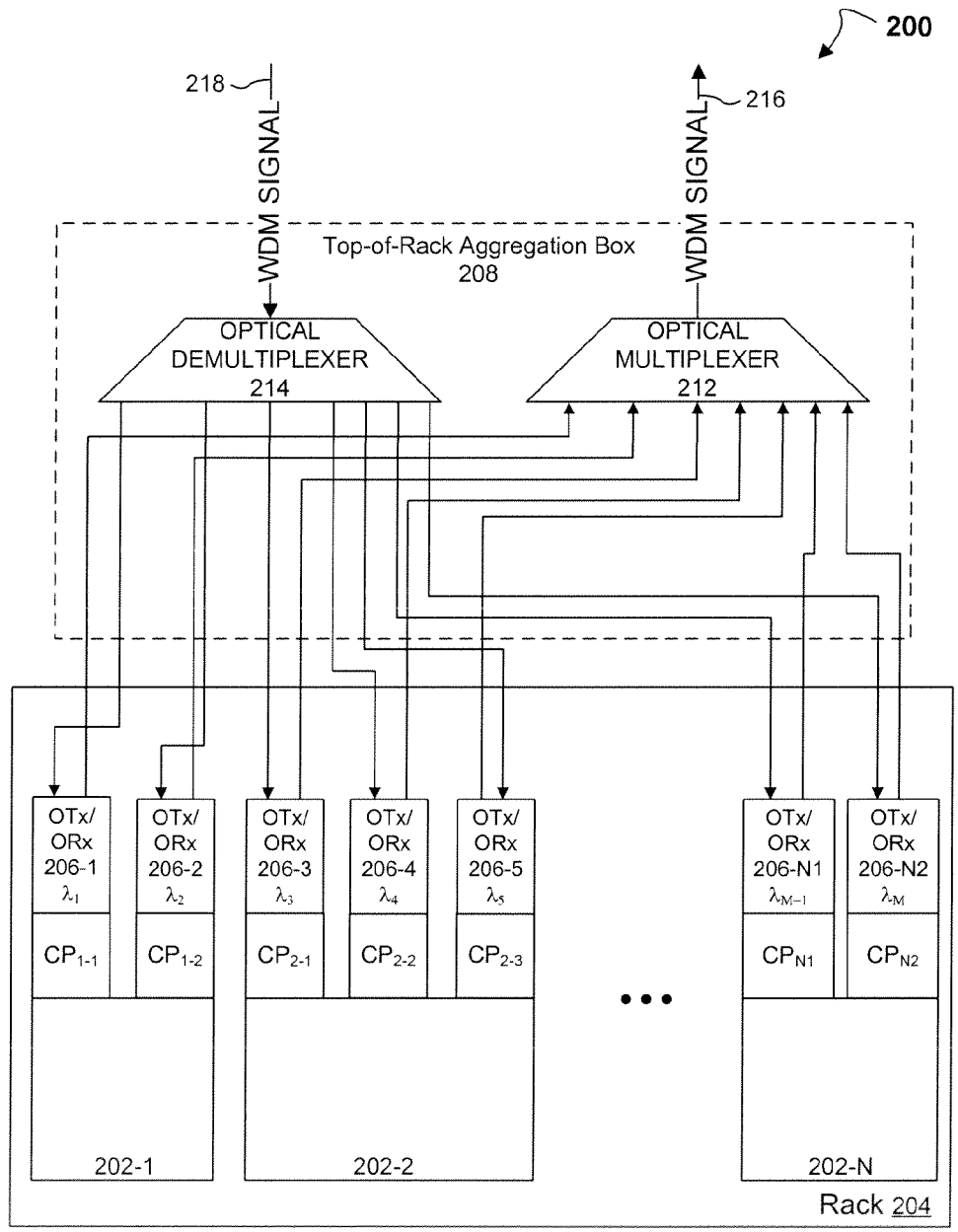
FIG. 2 is a block diagram of another implementation of an aggregation and de-aggregation apparatus using a passive optical mux and demux.

FIG. 2 illustrates an alternative implementation of a bandwidth aggregator and de-aggregator apparatus 200. Apparatus 200 includes a plurality of networking elements 202-1 through 202-N housed in a rack 204, where N can be any number greater than one. Each networking element 202 can be a server, a router, a switch or some other electrical networking or storage element. Each network element 202 is coupled to one or more corresponding communication ports (CP): network element 202-1 is coupled to communication ports CP1-1 and CP1-2, network element 202-2 is coupled to communication ports CP2-1, CP2-2 and CP2-3, and so on. Generally, a rack 204 having N networking elements 202 can have M communication ports, where M is equal to or greater than N. Each CP is also communicatively coupled to a corresponding optical transceiver 206: CP1-1 is coupled to optical transceiver 206-1, CP1-2 is coupled to optical transceiver 206-2, etc. In the illustrated implementation each transceiver 206 is integrated with its corresponding CP, but in other implementations the transceiver, the CP, and the networking element can be separate elements.

Each optical transceiver 206 includes an optical receiver (ORx) and an optical transmitter (OTx). Each transmitter includes a laser that generates an optical carrier signal at a wavelength $\lambda$, different than the carrier wavelength of the other transceivers 206; hence, transceiver 206-1 transmits at a carrier wavelength $\lambda_1$, transceiver 206-2 transmits at a different carrier wavelength $\lambda_2$, where $\lambda_1$ is different from $\lambda2$, and so forth. In each transmitter, data can be modulated onto the optical carrier signal to create an optical data signal (see FIG. 5). The optical data signals from all transmitters are then fed into the optical multiplexing device 212.

A top-of-rack (TOR) aggregation box 208 is positioned in rack 204, such as on top of rack 204. Aggregation box 208 can alternatively be located elsewhere, such as below or beside the rack. Any time a "top-of-rack aggregation box" is described, this can be replaced with an aggregation box located remotely. Top-of-rack box 208 houses an optical mux 212 and an optical demux 214, both of which are passive optical elements that require little or no maintenance and no electrical power, cooling, etc. In certain implementations, optical mux 212 can be optical coupler arrays, optical combiners, Littrow gratings, diffraction grating devices such as Array Waveguide Gratings (AWGs), Echelle gratings, wavelength add-drop multiplexers, or other kinds of optical multiplexing devices to combine optical signals with different carrier wavelengths into an optical WDM signal. Similarly, in certain implementations optical demux 214 includes splitter arrays with Fabry-Perot filters (or other types of wavelength dependent filters), optical circulators with wavelength dependent filters, diffraction grating devices such as Fiber Bragg Gratings, Echelle gratings, Littrow gratings, AWGs, add-drop multiplexers, cascaded Mach-Zehnder interferometers, silicon ring oscillator, and other kinds of demultiplexing devices. In other implementations the mux and demux could be implemented with a pair of optical couplers and splitters. Use of the splitter for the demux would necessitate a wavelength filter in front of or integrated into the receiver at each port to select the correct wavelength signal, but such filters may not be necessary with some demultiplexer solutions.

Optical mux 212 can be coupled to the optical transmitters of each transceiver 206 by an optical fiber, so that optical mux 212 receives optical signals from each transceiver 206, combines these signals into a WDM signal, and then transmits the WDM signal through optical fiber 216. Similarly, optical demux 214 is coupled to the receiver inputs of each transceiver 206 by an optical fiber, so that optical demux 214 receives a WDM signal through optical fiber 218, separates the individual signals from the WDM signal, and transmits the individual signals to the receivers in transceivers 206.

Apparatus 200 functions similarly to apparatus 100, except that various components such as transceivers 107 and 108 are eliminated, and components are grouped differently. Advantages of this approach include increased fault tolerance, as no electrical power is required at the aggregation box and the failure rate of a passive optical component is extremely low. The number of components can also be significantly reduced, which simplifies the system and increases fault tolerance. Fate sharing between the M communication ports is also eliminated, since the only shared resource is the passive mux and demux. Finally, since apparatus 200 pushes single-mode-fiber (SMF)-based interconnections all the way down to the communication ports, the benefits of WDM SMF links are obtained for this rack-to-TOR interconnection, meaning scalability in bandwidth and reach are achieved and fiber count and patch panel size are reduced in comparison to electrical interconnections or multimode fiber interconnections. As a result of these benefits, the fiber infrastructure can be kept constant, meaning that system capacity can be upgraded simply by upgrading the end components without the need to add to or otherwise alter the underlying fiber optic infrastructure.

As the bandwidth to and from individual CPs continues to increase, in some implementations each individual CP uses a multi-wavelength WDM signal (e.g., a waveband signal) which is generated and received with a corresponding WDM transceiver. Combining or multiplexing signals from multiple CPs, where the signal from each CP consists of multiple wavelengths, can be accomplished with an optical band-mux which interleaves or combines waveband signals to aggregate the various WDM signals onto a single fiber. On the receive side, demultiplexing of waveband signals can be accomplished with an optical band demux, which separates the various waveband signals from the single fiber, into the multiple outputs. In certain implementations, optical band mux 212 can be optical coupler arrays, cascaded thin film filters, optical combiners, Littrow gratings, diffraction grating devices such as Array Waveguide Gratings (AWGs), Echelle gratings, wavelength add-drop multiplexers and/or other kinds of optical multiplexing devices to combine optical signals with different carrier wavelengths into an optical WDM signal. Similarly, in certain implementations, optical band demux 214 can include splitter arrays with Fabry-Perot filters (or other types of wavelength dependent filters), optical couplers with wavelength dependent filters, optical circulators with wavelength dependent filters, diffraction grating devices such as Fiber Bragg Gratings, Echelle gratings, silicon ring oscillator, Littrow gratings, AWGs, add-drop multiplexers, cascaded Mach-Zehnder interferometers, and other kinds of demultiplexing devices. In other implementations the mux and demux could be implemented with a pair of optical couplers. Use of the coupler for the demux would necessitate a wavelength band filter in front of or integrated into the receiver at each port to select the correct waveband signal, but such filters may not be necessary with some demultiplexer solutions.

Figure 3:
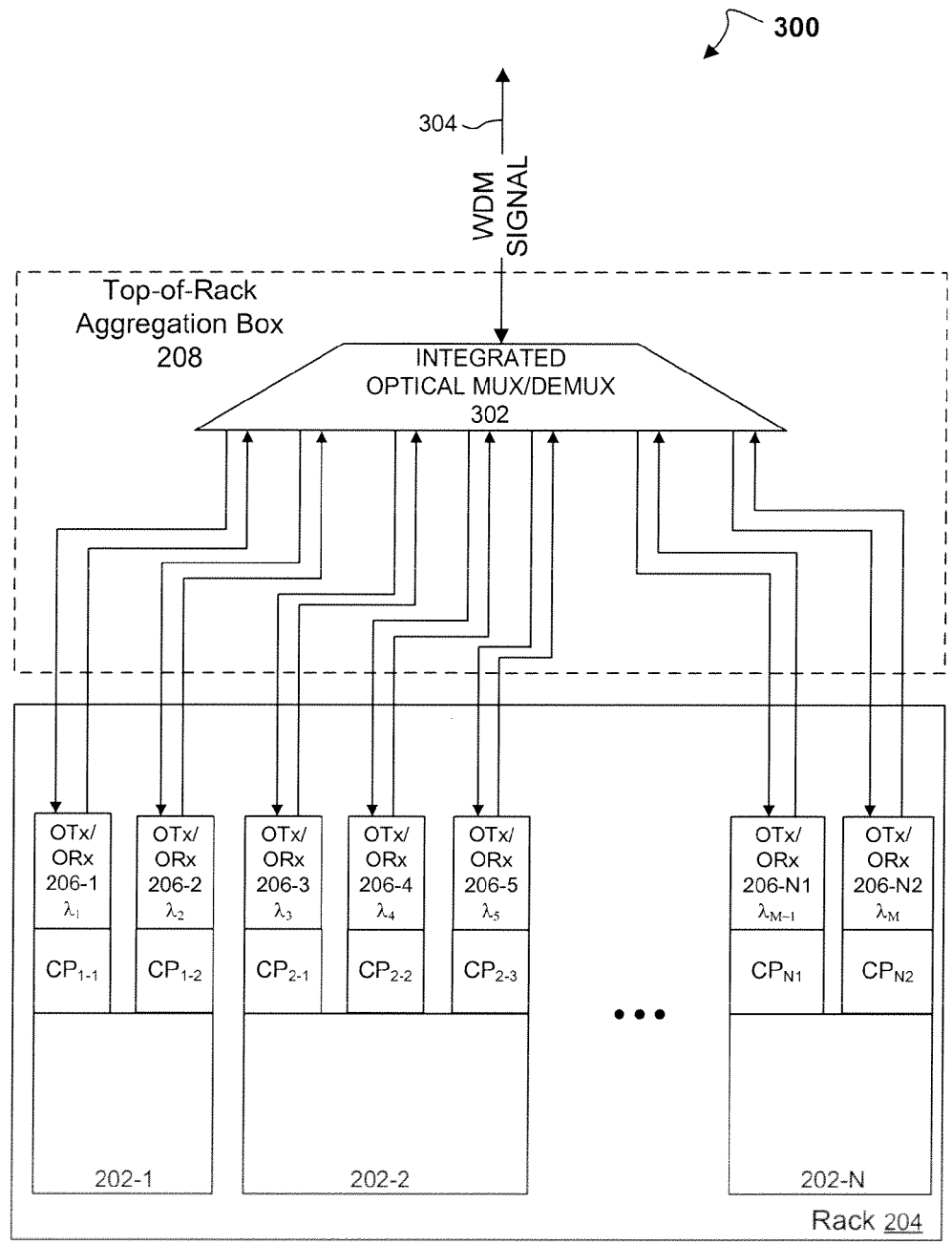
FIG. 3 is a block diagram of another implementation of an aggregation and de-aggregation apparatus using an integrated, passive optical mux/demux.

FIG. 3 illustrates another implementation of an aggregation and de-aggregation apparatus 300. Apparatus 300 is in most respects similar to apparatus 200. The primary difference is that apparatus 300 replaces separate optical mux 212 and optical demux 214 with a single integrated optical mux/demux 302. Integrated optical mux/demux 302 combines the outgoing (transmission) optical WDM signals and separates the incoming (reception) optical WDM signals. Combining the optical demux with the optical mux means that single-mode optical fiber 304 is bidirectional, such that single-mode fiber 304 can carry optical WDM signals in two directions simultaneously. As in apparatus 200, in apparatus 300 top-of-rack aggregation box 208 includes only passive optical elements that require little or no maintenance and no power, cooling, etc.

Apparatus 300 operates similarly to apparatus 200, but in apparatus 300 integrated optical mux/demux 302 has two functions. First, mux/demux 302 receives non-multiplexed optical data signals with different carrier wavelengths from transceivers 206 and, using wavelength division multiplexing (WDM), multiplexes or combines the optical data signals into an optically multiplexed (muxed) signal and transmits that optically muxed signal into single-mode fiber 304. Second, integrated mux/demux 302 receives an optically muxed signal through single-mode fiber 304, de-multiplexes or separates the optically muxed signal into its component data signals with different optical carrier wavelengths, and routes the individual demultiplexed signals to the correct receiver. This integrated optical mux/demux 302 has a single connection to one single mode fiber 304, and allows the bidirectional operation. In the particular case that in each transceiver 206 the optical transmitters have the same carrier wavelength as the optical receivers, an optical directional multiplexer, such as an optical circulator, can be used to combine the transmitting and receiving signals on a single fiber or waveguide, which connects to the mux/demux 402 (see, e.g., FIGS. 4A-4B).

Figure 4A:
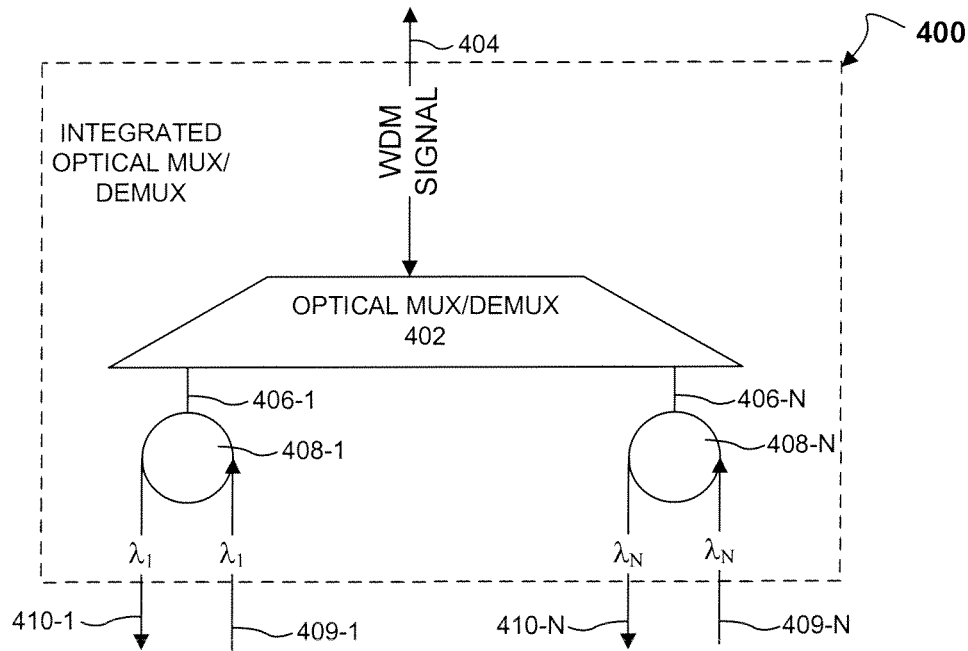
FIGS. 4A-4B are block diagrams of implementations of integrated optical multiplexer/demultiplexers that can be used with the implementation of an aggregation and de-aggregation apparatus shown in FIG. 3.
Figure 4B:
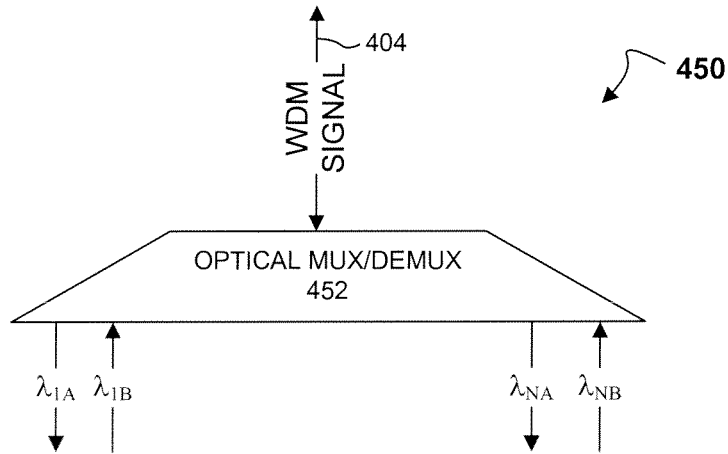

FIGS. 4A-4B illustrate implementations of an integrated optical mux/demux 400 that can be used in apparatus 300. FIG. 4A illustrates an optical mux/demux 402 that receives and transmits bi-directional WDM signals via a single-mode fiber 404. Mux/demux 402 includes a plurality of input/output ports 406-1 through 406-N, and an optical circulator 408 is coupled to each input/output port 406. The input 409 of each optical circulator is coupled to the transmitter of a corresponding transceiver, while the output 410 of each optical circulator is coupled to the receiver of the corresponding transceiver. In an implementation where the transceiver transmits and receives at substantially close or identical carrier wavelengths, optical circulator 408 can separate the transmitted optical data signals from the received optical signals; in other words, optical circulator 408 sorts out the optical data signals based on their directionality, even when they have the same carrier wavelength.

FIG. 4B illustrates an integrated optical mux/demux 452 that receives and transmits bi-directional WDM signals via a single-mode fiber 404. Mux/demux 452 includes a plurality of pairs of input and output ports where each input port in the pair receives an optical data signal with a first carrier wavelength and the corresponding output port outputs a signal at a different wavelength. Mux/demux 452 can be used in an implementation of apparatus 300 in which the received wavelengths are different from the transmitted wavelengths (i.e., 2N different wavelengths used for the entire integrated mux/demux).

In FIGS. 4A-4B, a number of implementations are possible for the multiplexer, including, but not limited to, arrayed waveguide gratings, Echelle gratings and other gratings devices, optical splitter/combiner, thin film filter based wavelength combiners, etc.

As the bandwidth to and from individual CPs continues to increase, in some implementations each individual CP can use a multi-wavelength WDM signal (e.g., a waveband signal) which is generated and received with a corresponding WDM transceiver. Combining or multiplexing signals from multiple CPs, where the signal from each CP consists of multiple wavelengths, can be accomplished with an integrated optical band-mux/demux which interleaves/de-interleaves waveband signals to combine/separate the various WDM signals onto a single fiber. In certain implementations, optical band mux/demux can be optical coupler arrays, Littrow gratings, diffraction grating devices such as Array Waveguide Gratings (AWGs), Echelle gratings, wavelength add-drop multiplexers and/or other kinds of optical mux/demux devices to combine optical signals with different carrier wavelengths into an optical WDM signal. In other implementations the mux and demux could be implemented with an optical coupler. Use of the coupler would necessitate a wavelength band filter in front of or integrated into the receiver at each port to select the correct waveband signal, but such filters may not be necessary with some demultiplexer solutions.

FIG. 5 illustrates an implementation of an optical transmitter 500, which includes a laser 502. Coupling optics 506 are positioned at the output of laser 502 to form a focused carrier signal 507 and can include refractive, reflective and/or diffractive elements. An optical modulator 508 is positioned in the optical path of carrier signal 507, and optics 510 are positioned in the optical path of the output of optical modulator 508 to launch the output of the optical modulator into a waveguide 512. Other implementations of a transmitter include other elements that are not shown, such as beamsplitter/combiner, wavelength locker, laser or modulator driver, monitor photodetector, control circuits and so on.

Laser 502 can be any kind of laser that outputs an optical beam at the desired carrier wavelength and within required power and efficiency constraints. Implementations of laser 502 output a wavelength ranging from about 1200 nm to about 1700 nm, but in other implementations wavelengths outside this range are output. In implementations of transmitter 500 that will be used together with fairly dense wavelength spacing (coarse WDM is defined as about 20 nm wavelength spacing; wavelength spacing less than this, for example 10 nm or less in one implementation, can be considered "denser" WDM), a laser that outputs with narrow modulated spectral width and within a narrow wavelength band is desirable when high spectral efficiency is needed. In one implementation, laser 502 is a Fabry-Perot laser, but in other implementations it is another type of laser, such as a continuous wave (CW) laser, a DBR laser, DFB laser, a short-cavity DFB laser, a tunable laser, a hybrid laser with InP/Silicon or Ge/Silicon, a multi-line laser coupled with a filtering element, or a quantum dot (QD) laser.

In some implementations, the output wavelength of laser 502 is temperature dependent, which can lead to wavelength drift during operation. In implementations where the output wavelength of laser 502 needs to be controlled, a temperature control unit 504 is coupled to the laser or integrated with the laser to stabilize the output wavelength. Temperature control unit 504 can be an active element, such as a thermo-electric cooler (TEC), or can be a passive element such as a heat sink or heater to transfer heat from or to the laser. A temperature control unit 504 could also be shared among some or all devices inside one implementation (i.e., other lasers, photodetectors, modulators, circuits, multiplexers, demultiplexers, etc.).

Optical modulator 508 is positioned in the path of the carrier signal 507 and is also coupled to a data source 503. In one implementation data source 503 is a communication port of a server, but in other implementations data source 503 is the communication port of another kind of device, such as an electrical router or switch. In other implementations data source 503 includes interface devices connected to a communication port.

Optical modulator 508 performs an electro-optic conversion of the signal received from data source 503 by modulating the data onto the carrier signal 507 from laser 502. The output of optical modulator 508 is thus an optical data signal 509. The optical modulator 508 can be implemented in various configurations, such as an electro-optic Mach-Zehnder modulator (MZM), an electro-absorption modulator (EAM), or a ring modulator. In the illustrated implementation optical modulator 508 is an external modulator, but in other implementations, laser 502 is modulated directly by the data 503 in the form of a driving current feeding into the laser, and produces a modulated optical data signal at a respective WDM channel.

Optics 510 are positioned in the optical path of optical data signal 509 to launch the optical data signal or signals from multiple input data channels, into a waveguide 512, which in one implementation is a single-mode optical fiber. The particular nature of optics 510 will depend on such factors as the size of the optical data signal 509 and the size of the core of waveguide 512. For example, if the optical data signal 509 spreads out at a particular angle, optics 510 must be large enough to capture the signal, as well as focus the signal into the core of waveguide 512. In certain implementations, optics 510 include refractive, reflective and/or diffractive optics.

FIG. 6 illustrates an implementation of an optical receiver 600. Receiver 600 includes an input waveguide 602 optically coupled to optics 606. Optics 606 is in turn optically coupled to photodetector 610, and photodetector 610 is electrically connected to signal processing circuitry 614. In one implementation waveguide 602 is a single-mode optical fiber, but in other implementations other types of waveguides are used.

Optics 606 are positioned in the optical path of received optical data signal 604 and serve to condition optical signal 604, for example by focusing it, and to direct it toward photodetector 610. The particular nature of optics 606 will depend on such factors as the spread angle of optical data signal 604 when it leaves the end of waveguide 602 and the size of photodetector 610. In some implementations, optics 606 include one or more of refractive, reflective and diffractive optics. In some implementations optics 606 are unnecessary, such that received optical data signal 604 can go directly from waveguide 602 to photodetector 610.

Photodetector 610 receives optical data signal 608, performs an optoelectronic conversion, and outputs an electrical data signal 612. Photodetector 610 can be any kind of photodetector that has sufficient responsivity at the carrier wavelength of received optical data signal 608. Here, sufficient responsivity implies a photodetector responsivity high enough such that the resulting electrical data signal 612 is large enough and can be detected cleanly, with high integrity and little or no errors. In one implementation photodetector 610 is a p-n or p-i-n photodiode, but in other implementations other types of photodiodes, such as avalanche photodiodes (APD), Schottky photodiodes, and phototransistors, are used.

Signal processing circuitry 614 receives electrical data signal 612, extracts the data from the data signal, and transmits that data to a communication port of a device such as a server, a switch or a router. The data can also be transmitted to interface devices, which in turn connect to a communication port. Signal processing circuitry 614 can also provide additional signal conditioning functions, such as signal amplification, filtering, etc.

Although FIGS. 5-6 illustrate the transmitter and receiver as separate entities, in other implementations the various wavelength transmitters and receivers and their component parts are grouped/integrated into a single system—that is, each transmitter and receiver pair corresponding to a particular communication port are integrated into a transceiver. For the transmitter side, all the lasers or a sub-set of the lasers can be integrated into a single semiconductor substrate. Likewise, if modulators were used, the lasers and modulators could be integrated, and additionally, the various laser-modulator pairs could be integrated into arrays. For the receiver side, all the photodetectors or a sub-set of the photodetectors can be integrated into a single semiconductor substrate. Finally, the lasers, modulators, photodetectors, etc., could all be integrated, or sub-sets integrated, in the form of a monolithic or hybrid photonic integrated circuit (PIC). In addition, the above photonic devices can be integrated with the electronic circuits, in the form of a monolithic or hybrid optoelectronic integrated circuit (OEIC).

Figure 7:
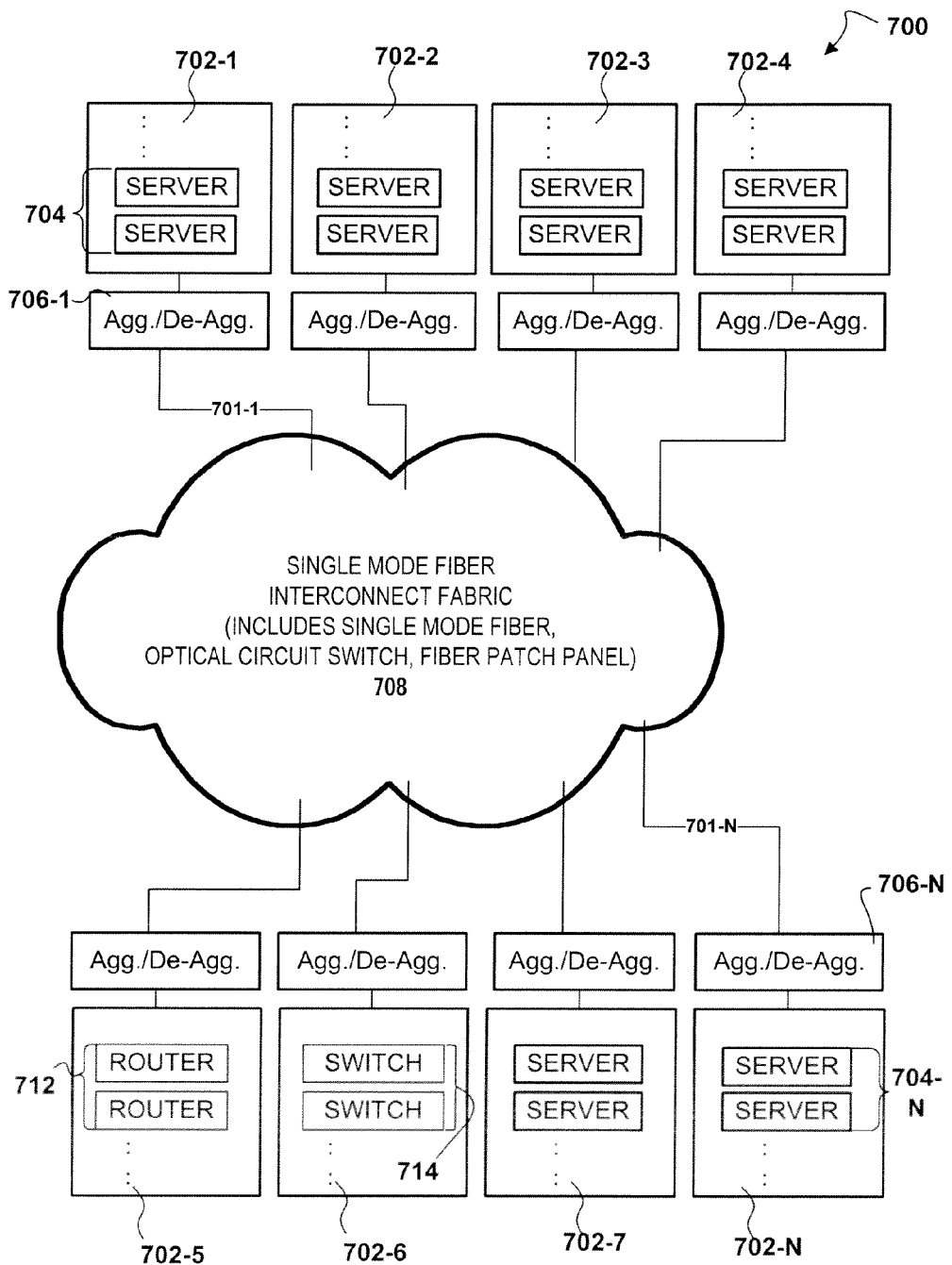
FIG. 7 is a block diagram of an implementation of a data center cluster.

FIG. 7 illustrates an implementation of a data center 700. Data center 700 includes a plurality of racks 702-1 to 702-N, where N can be any number greater than one. Within each rack are housed one or more communication ports; in some racks (e.g., racks 702-1 to 702-4 and 702-6 to 702-8) the communication ports are a plurality 704 of individual servers, while in other racks (e.g., racks 702-5 to 702-6) the communication ports can be those of other electrical networking elements such as electrical routers 712 and electrical switches 714. Each individual server, switch or router in the rack includes one or more CPs and transceivers as illustrated in FIGS. 1-3 and all the transceivers in a rack are coupled to a top-of-rack aggregation box 706 having optical multiplexers and demultiplexers therein, as also illustrated in FIGS. 1-3. Each top-of-rack aggregation box 706 is in turn optically coupled to the data center's single-mode fiber interconnect fabric 708 by one single-mode optical fiber 710 when bi-directional WDM communication is used (see FIG. 3), or by a pair of single-mode optical fibers 710 when unidirectional WDM communication is used (see FIGS. 1 and 2).

Single-mode fiber interconnect fabric 708 enables the different servers 704, routers 712, and switches 714 within data center 700 to communicate with each other, as well as to communicate with other servers or computers external to the data center. In one implementation, single-mode fiber interconnect fabric 708 is based on single-mode fiber or multiple strands of single-mode fiber, and can include optical amplifiers, optical wavelength or packet routers, optical packet or circuit switches, fiber patch panels and other optical networking elements compatible with single-mode optical fiber.

The above description of illustrated implementations of the invention, including what is described in the abstract, is not intended to be exhaustive or to limit the invention to the precise forms disclosed. While specific implementations of, and examples for, the invention are described herein for illustrative purposes, various equivalent modifications are possible within the scope of the invention, as those skilled in the relevant art will recognize. These modifications can be made to the invention in light of the above detailed description.

The terms used in the following claims should not be construed to limit the invention to the specific implementations disclosed in the specification and the claims. Rather, the scope of the invention is to be determined entirely by the following claims, which are to be construed in accordance with established doctrines of claim interpretation.

The invention claimed is:

1. An apparatus comprising:
   a plurality of communication ports, each communication port coupled to a corresponding networking element disposed in a rack;
   a plurality of optical transceivers, each optical transceiver integrated with a corresponding communication port and including an optical receiver and an optical transmitter, wherein the optical transmitter transmits an optical data signal having a carrier wavelength different than any other of the plurality of transmitters; and
   a passive optical multiplexer and demultiplexer module disposed in a fully passive top-of-rack (TOR) aggregation box that requires no electrical power supply separate from the rack and including:
      an optical multiplexer including a wavelength division multiplexing (WDM) output and a plurality of inputs, each input directly coupled to one of the plurality of optical transmitters, and
      an optical demultiplexer including a WDM input and a plurality of outputs, each output directly coupled to one of the plurality of optical receivers;
   wherein the passive elements in the TOR box eliminate fate sharing among the plurality of communication ports.

2. The apparatus of claim 1 wherein the plurality of networking elements are housed within a rack and wherein the passive optical multiplexer and demultiplexer module is external to the rack.

3. The apparatus of claim 1 wherein each network element can be a server, a router, a switch, or a storage device.

4. The apparatus of claim 1 wherein each optical transmitter is coupled to one of the plurality of inputs of the optical multiplexer via single-mode optical fiber and each optical receiver is coupled to one of the plurality of outputs of the optical demultiplexer via single-mode optical fiber.

5. The apparatus of claim 1, further comprising a single-mode optical fiber coupled to the WDM output and a single-mode optical fiber coupled to the WDM input.

6. The apparatus of claim 1 wherein the optical multiplexer is a band multiplexer and the optical demultiplexer is a band demultiplexer.

7. The apparatus of claim 6 wherein the WDM output transmits a waveband signal and the WDM input receives a waveband signal.

8. A data center comprising:
   a plurality of racks, each rack comprising:
      a plurality of networking elements, each networking element coupled to a corresponding communication port,
      a plurality of optical transceivers, each optical transceiver integrated with a corresponding communication port and including an optical receiver and an optical transmitter, wherein the optical transmitter transmits an optical data signal having a carrier wavelength different than any other of the plurality of transmitters, and
      a passive optical multiplexer and demultiplexer module disposed in a fully passive top-of-rack (TOR) aggregation box that requires no electrical power supply separate from the rack and directly coupled to each of the plurality of transmitters and directly coupled to each of the plurality of receivers, wherein the passive elements in the TOR box eliminate fate sharing among the plurality of communication ports; and
   an optical single-mode fiber interconnect fabric comprising routing and switching elements coupled by single-mode optical fiber, wherein the optical interconnect fabric is optically coupled to each passive optical multiplexer and demultiplexer module by at least one single-mode optical fiber carrying an optical WDM signal.

9. The data center of claim 8 wherein the passive optical multiplexer and demultiplexer module comprises:
   an optical multiplexer including a wavelength division multiplexing (WDM) output and a plurality of inputs, each input coupled to one of the plurality of transmitters by a single-mode optical fiber, and
   an optical demultiplexer including a WDM input and a plurality of outputs, each output coupled to one of the plurality of receivers by a single-mode optical fiber.

10. The apparatus of claim 9 wherein the optical multiplexer is coupled to the single-mode fiber interconnect fabric by a single-mode optical fiber coupled to the WDM output and the optical demultiplexer is coupled to the single-mode fiber interconnect fabric by a single-mode optical fiber coupled to the WDM input.

11. The data center of claim 8 wherein each network element can be a server, a router, a switch, or storage element.

12. The system of claim 8 wherein the optical multiplexer is a band multiplexer and the optical demultiplexer is a band demultiplexer.

13. The system of claim 12 wherein the WDM output transmits a waveband signal and the WDM input receives a waveband signal.

\* \* \* \* \*